United States Patent [19]

Foster et al.

[11] Patent Number: 5,794,570
[45] Date of Patent: Aug. 18, 1998

[54] PORTABLE APPARATUS FOR GROOMING AND WASHING PETS

[76] Inventors: Jody R. Foster; Wendy A. Leger, both of 3917 Quarry Rd., La Mesa, Calif. 91941

[21] Appl. No.: 916,715

[22] Filed: Aug. 18, 1997

[51] Int. Cl.$^6$ ............................................. A01K 13/00
[52] U.S. Cl. ................................. 119/756; 119/673
[58] Field of Search ........................... 119/756, 751, 119/752, 673, 753, 754, 757, 676; D23/284, 277; 4/538, 539, 540, 548, 549, 551, 553, 555, 592, 593, 594, 595

[56] References Cited

U.S. PATENT DOCUMENTS

D. 273,700   5/1984   Parker ............................. D23/284
5,193,487   3/1993   Vogel .............................. 119/676 X
5,329,878   7/1994   McCauley ..................... 119/673 X
5,662,069   9/1997   Smith ............................ 119/673 X
5,678,511  10/1997   Day ................................. 119/676

Primary Examiner—Michael J. Carone
Assistant Examiner—Yvonne R. Abbott
Attorney, Agent, or Firm—Frank D. Gilliam

[57] ABSTRACT

A portable pet grooming center a tub removably mounted on a pedestal. The tub can be fastened to the pedestal for grooming pets, then removed and the pedestal nested in the tub for storage or transport. A platform is provided for installation in the tub when grooming a smaller pet. One end of the tub has a U-shaped cut out and a small stairway is provided so that a larger pet can walk up the stairway and over the cut out into the tub. The tub slopes toward a drain at one end and a hose is connected to the drain. Preferred arrangements for releasably securing the tub to the pedestal includes over center clamps and slide together brackets.

14 Claims, 2 Drawing Sheets

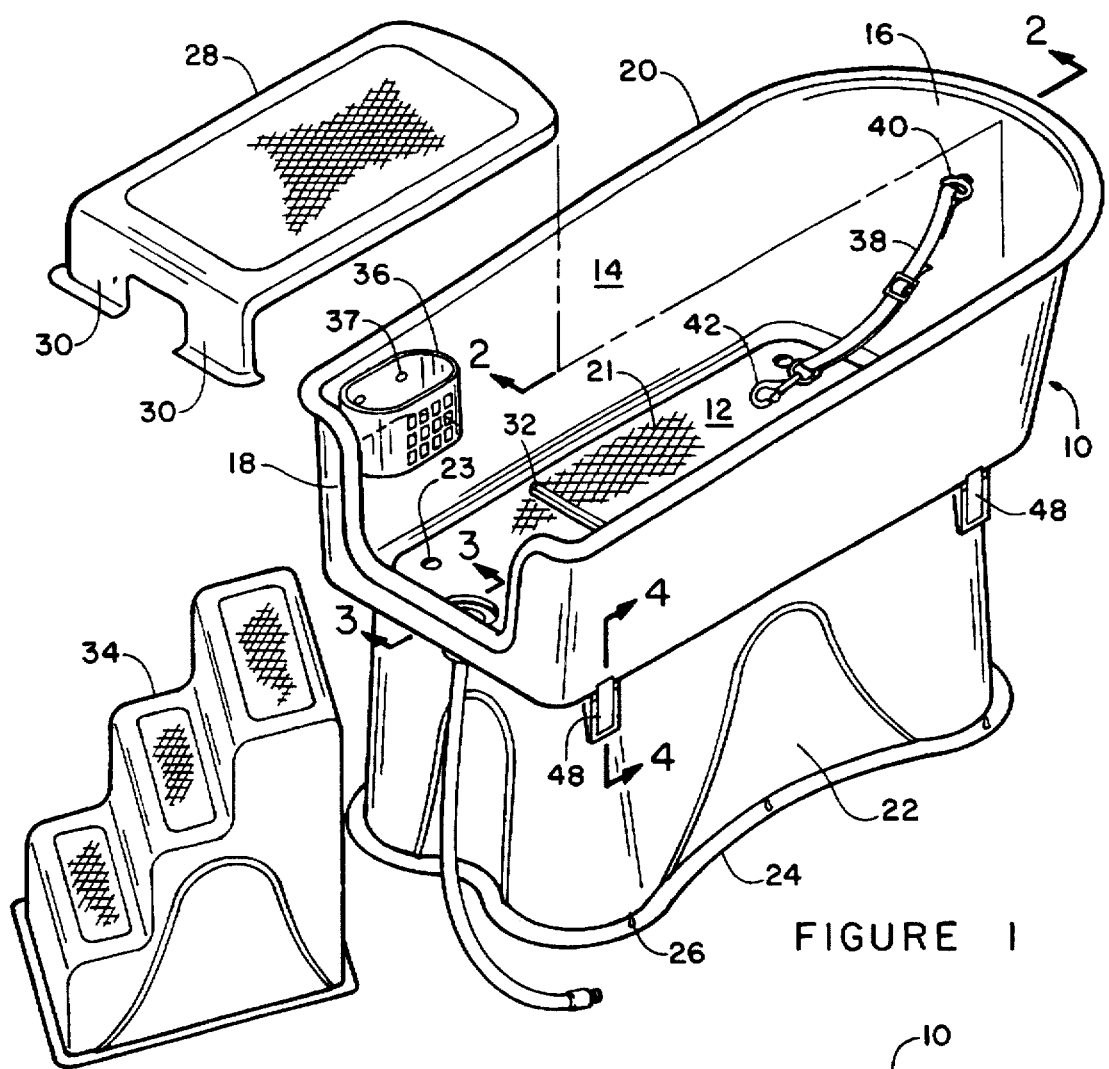
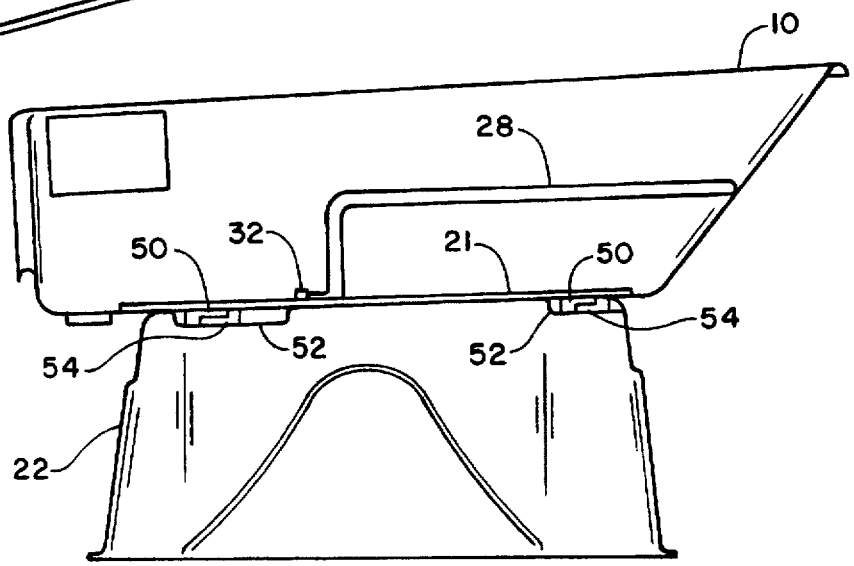

PORTABLE APPARATUS FOR GROOMING AND WASHING PETS

FIELD OF THE INVENTION

This invention relates to an elevated, portable, apparatus for washing and grooming pets, in particular dogs.

BACKGROUND OF THE INVENTION

Pets such as dogs, cats, rabbits, small farm animals (in particular those involved in 4H and similar programs) and the like must be washed, brushed, clipped and otherwise groomed from time to time for health and hygiene reasons. Generally in the home the pets are washed in a shower, bathtub, laundry tub or another tub intended for another purpose. This can be very messy and difficult, since the person doing the washing generally must kneel on the floor next to the tub and the pet is not truly restrained. Where a higher tub, such as a laundry tub, is used, the pet must be lifted over a high side into the tub, a difficult and possibly back straining operation with a large dog.

During washing and grooming, the pet may become frightened and attempt to climb out of the tub, which is often slippery, and injure itself. Further, dogs will often try to shake off the water and shampoo, soaking the person doing the washing and scattering water and shampoo over the area if a shower or low sided tub is being used. This problem is aggravated where the pet is being washed due to an encounter with a skunk, with odoriferous water being scattered over the area.

Pet hair brushed or clipped from the pet in a bathtub or the like is likely to clog the drain. Further, if the pet is given a final rinse with a flea dip or similar treatment, the bathtub will require careful cleaning before use by the family.

Since washing a pet without proper equipment is so difficult and inconvenient, many pets are not given the proper bathing and grooming, which can lead to problems with the skin, ears, etc.

Professional groomers generally have specialized tubs for use in washing and grooming pets. Large tubs, often made from stainless steel, are heavy and very expensive. In the case of mobile groomers who take the grooming equipment to their customers in a van, the weight and expense of such equipment is a significant problem.

People who travel in recreational vehicles for extended periods, especially those showing pets at shows that are periodically held around the country have a particular problem. They generally have several dogs, cats or other animals being shown and must always have them very well groomed for showing. The typical motorhome or trailer shower or tub is totally unsuited for grooming a number of animals. Typical small grooming tubs are used outside the vehicle, placed on the ground or on any convenient table such as a typical campground picnic table. Whether on the ground or on a table with attached benches, grooming several animals is difficult and can result in serious back discomfort or even injury.

Several different portable bet bathing tubs have been developed in attempts to meed the needs of pet owners, groomers and people traveling with pets. Vogel in U.S. Pat. No. 5,193,487 describes a tub having a low walled entrance at one end and a strap for connection to a collar to restrain the pet. While effective for washing and grooming, this tub is made to rest on the ground, with the attendant problems with the user having to kneel or bend to do the grooming. The tub could be placed on a table, although this would not be stable or safe with a large, active, dog or the like.

Grooming apparatus having an enclosure substantially surrounding the animal's body have been developed. Typical of these is the device described by Grifa in U.S. Pat. No. 4,020,796. Wheels are provide under a tub for movement and a removable covers the animal with its head extending through an opening. A spray system is provided for washing the animal. This system still has the problem of being located at ground level, requiring the used to kneel or bend to perform the grooming. While this system would effectively wet down or rinse the animal, the arrangement is complex and not well suited to shampooing and treating with anti-flea liquids and the like.

Another arrangement, as described by Cole in U.S. Pat. No. 4,836,144 simply provides an elevated tray with a tether at one end for restraining the pet. While possibly useful to a professional groomer wearing complete waterproof clothing, this would not be useful at home or in a recreational vehicle, since water, shampoo or treating liquids would be widely spread over the area when ever the pet would shake itself.

Thus, there is a continuing need for an improved pet bathing and grooming apparatus that is more convenient and comfortable to use, that will safely and comfortably contain the pet, that is easily portable, lightweight, compact when nested for storage or transport and is adaptable for use with pets of different sizes.

SUMMARY OF THE INVENTION

The above noted problems, and others, are overcome by the portable pet grooming system of this invention, which basically comprises an elongated tub with a cut out at one end and a generally inverted tub shaped pedestal that can be releaseably fastened to the tub to support the tub at a convenient height for washing, clipping or otherwise grooming a pet such as a dog. The pedestal is configured to nest in the tub for convenient transportation and storage. The tub includes a generally U-shaped cut out in one end wall so that a pet can be easily lifted into the tub without the necessity of lifting it over a side wall or a larger pet can step into the tub. One or more baskets for holding grooming aids are preferably releasably mounted on the inner or outer wall surface at any convenient locations.

A raised platform that fits in the tub to raise the base is preferably provided to raise small pets, such as small dogs, cats, rabbits, etc. to a convenient height for grooming. Also, while small pets can be simply lifted into the tub, preferably a short set of steps is provided so that a larger pet can walk up the steps, step over the cut out wall and enter the tub.

A restraining means, such as an adjustable strap hooked to an eyebolt in a tub wall and having a snap for connection to a pet's collar is preferably provided.

The base or floor of the tube should slope toward one end and a drain should be provided at the lowest point in the base for draining the tub of water. A screen is preferably placed over the drain to catch and collect any loose hair.

While any suitable releasable latching mechanism may be used to hold the tub to the pedestal during use of the tub in grooming, a plurality of over-center latches or at least one slide bracket arrangement is preferred for convenience of use and secure connection.

BRIEF DESCRIPTION OF THE DRAWING

Details of the invention, and of preferred embodiments thereof, will be further understood upon reference to the drawing, wherein:

FIG. 1 is a perspective view of the components of the grooming center of this invention;

FIG. 2 is an axial section view taken on line 2—2 in FIG. 1;

DETAILED DESCRIPTION OF PREFERRED EMBODIMENTS

Figure 3:
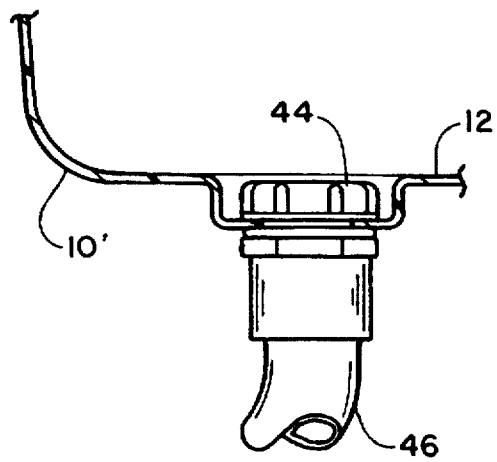
FIG. 3 is a detail section view of the drain, taken on line 3—3 in FIG. 1.

Referring to FIG. 1, the pet grooming center includes a tub 10 having a base 12 with two upstanding sidewalls 14, a first end 16 and a second end 18. Tub 10 may be formed in any suitable manner from any suitable manner. A rounded-over edge 20 is provided along all-edges. For optimum manufacturability and durability, vacuum molded polyethylene or polypropylene are preferred. Since the tub may be used or stored outside, preferably an ultraviolet light stabilizing compound is incorporated into the material.

Preferably a rubber-like, non-slip, pad 21 is provided on base 12. The pad may be fastened to the base of tub 10 by any suitable means, such as plastic studs adhesively or heat welded to the base, with caps 23 threaded onto the studs through holes in pad 21.

In order to raise the pet being groomed to a comfortable height, a pedestal 22 is provided for supporting tub 10. Pedestal 22 is generally tub shaped and configured to nest within tub 10 for storage and transport. A floor engaging flange 24 is provided around the open lower end of pedestal 22. In order limit sliding of the pedestal on the floor, preferably small, conventional rubber pads having an upstanding peg 25 are provided with the peg pressed through holes 26 from below. The pegs frictionally engage the hole walls so as to be held in place. If the grooming center is to be kept in one place for an extended period, screws, bolts or nails can be inserted through holes 26 in flange 24 to hold the pedestal firmly in place.

The upper surface of pedestal is shaped to conform to the base 12 of tub 10. If desired, raised ridges could be formed in the upper surface of pedestal 22 and corresponding recesses in the underside of tub base 12 to help prevent the tub from sliding even very slightly on the pedestal.

Where a small pet is to be groomed, the pet can be simply lifted into tub 10. With such a small pet, platform 28 may be inserted into tub 10 to raise the pet to a comfortable grooming height as seen in FIG. 2. Platform 28 preferably fits closely to the first end 18 and sidewalls 14 to prevent a pet's leg from slipping between the platform and a wall or end. Platform 28 is supported on legs 30 at the back and against first end 16 at the front. A ridge 32 may be provided in the base 12 of tube 10 to prevent platform from sliding to the back. Alternately, if a pad 21 is used, a slot or recess may be formed in the pad to receive legs 30 and hold platform 28 in place. If desired, additional legs 30 could be provided towards the front of platform 28.

Where a large pet, such as a large dog, is to be groomed, a set of steps 34 are preferably provided so that the pet can walk up the steps and step over the cut out area of second wall 18 into tub 10.

One or more baskets 36 may be releasably secured to an inner wall surface of tub 10 to hold grooming supplies. Any suitable releasable fastening means may be used, such as snaps 37, a bolt through the tub wall engaging keyhole like openings in the basket, hook-and-loop material of the sort sold under the Velcro® trademark, may be used.

A restraint strap 38 fastened at one end to an eyebolt 40 or similar means such as a padeye bonded to the tub wall is provided to restrain a pet during grooming. Strap 38 has a conventional snap for securing to a pet collar.

As seen in FIGS. 1 and 3, a drain 44 is provided through a hole in the base 12 of tub 10 for draining water from the tub. A hose 46 connected to drain 44 can extend to any container, building floor drain, etc. A screen could be placed over drain 44 to collect hair or other matter in the drain water, if desired.

Figure 4:
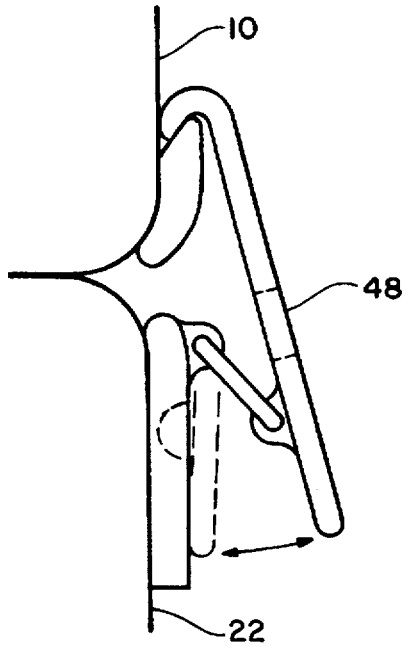
FIG. 4 is a detail view showing an over center clam fastening the tub to the pedestal.

A first fastener embodiment for fastening tub 10 to pedestal 22 is illustrated in FIGS. 1 and 4. At least one (preferably two) over center clamp 48 is installed across the tub to pedestal interface. These provide a snug, positive interconnection. These clamps and all other metal fittings are preferably made from stainless steel to assure freedom from corrosion and long term usefulness.

Figure 5:
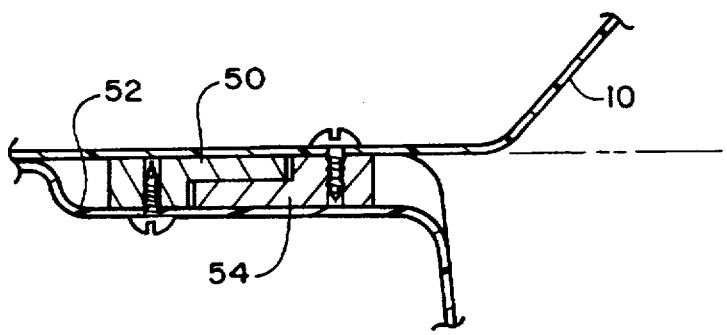
FIG. 5 is a detail section view taken on line 5—5 in FIG. 6, showing a slide bracket for fastening the tub to the pedestal.
Figure 6:
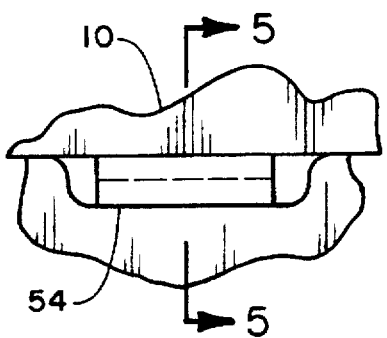
FIG. 6 is a detail view showing a slide bracket for fastening the tub to the pedestal.

A second fastener embodiment is shown in FIGS. 2, 5 and 6. A first slide member 50 is installed in a recess 52 in pedestal 22. A cooperating, interlocking, second slide member 54 is installed on the outside surface of base 12 of tub 10. To lock the slide members, tub 10 is placed slightly forward on pedestal 22, with the two slide members 50 and 54 space apart and the tub is slid toward the back of the pedestal to engage the members as shown in FIG. 5. For optimum locking, a second (or more) set of slide members 50 and 52 is provided in cooperating recesses 56 as seen in FIG. 2.

Thus, it can be seen that this grooming center is effective, safe and comfortable both for the groomer and the pet being groomed. The center can be stored and/or transported by separating pedestal 22 from tub 10, removing basket 36, removing and inverting the pedestal and placing it in the tub, then placing step 34, platform 28, basket 35 and any desired grooming supplies in the inverted pedestal.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

We claim:

1. A pet grooming center, which comprises:

an elongated tub for receiving a pet for grooming, having a base with interior and exterior surfaces, upstanding sides and first and second ends, said first end having a generally U-shaped cut out;

a generally inverted tub shaped pedestal having a base with interior and exterior surfaces, and upstanding sides and ends; and means for releaseably securing said exterior base surface of said elongated tub to said exterior base surface of said pedestal;

said pedestal configured to nest in said elongated tub with said exterior base surface of said pedestal in contact with said interior base surface of said tub for storage and transport.

2. The grooming center according to claim 1 further including a raised platform placeable on said interior base surface for receiving a smaller pet for grooming.

3. The grooming center according to claim 1 further including a stairway placeable adjacent to said U-shaped cut out so that a large pet may enter said tub by walking up said steps.

4. The grooming center according to claim 1 further including a restraining means secured to said second end for connection to a pet's collar.

5. The grooming center according to claim 1 wherein said tub interior surface slopes toward said first end and further including a drain means in said tub interior surface adjacent to said first end.

6. The grooming center according to claim 1 wherein said releasable securing means comprises a plurality of over center clamps mounted across an interface between said tub and pedestal with said tub mounted on said pedestal.

7. The grooming center according to claim 1 wherein said releasably securing means comprises at least one interlocking slide means.

8. The grooming center according to claim 1 further including at least one basket releasably secured to a wall of said tub.

9. A pet grooming center, which comprises:

an elongated tub for receiving a pet for grooming, having a base with interior and exterior surfaces, upstanding sides and first and second ends, said first end having a generally U-shaped cut out;

a raised platform placeable on said interior base surface for supporting a smaller pet for grooming;

a stairway placeable adjacent to said U-shaped cut out so that a large pet may enter said tub by walking up said steps;

a generally inverted tub shaped pedestal having a base with interior and exterior surfaces, and upstanding sides and ends;

means for releaseably securing said exterior base surface of said elongated tub to said exterior base surface of said pedestal;

said pedestal configured to nest in said elongated tub with said exterior base surface of said pedestal in contact with said interior base surface of said tub for storage and transport.

10. The grooming center according to claim 9 further including a restraining means secured to said second end for connection to a pet's collar.

11. The grooming center according to claim 9 wherein said tub interior surface slopes toward said first end and further including a drain means in said tub interior surface adjacent to said first end.

12. The grooming center according to claim 9 wherein said releasable securing means comprises a plurality of over center clamps mounted across an interface between said tub and pedestal with said tub mounted on said pedestal.

13. The grooming center according to claim 9 wherein said releasably securing means comprises at least one interlocking slide means.

14. The grooming center according to claim 9 further including at least one basket releasably secured to a wall of said tub.

* * * * *